Dec. 22, 1953  R. BACCHI  2,663,538
SPHERICAL VALVE
Filed March 29, 1948  4 Sheets-Sheet 1
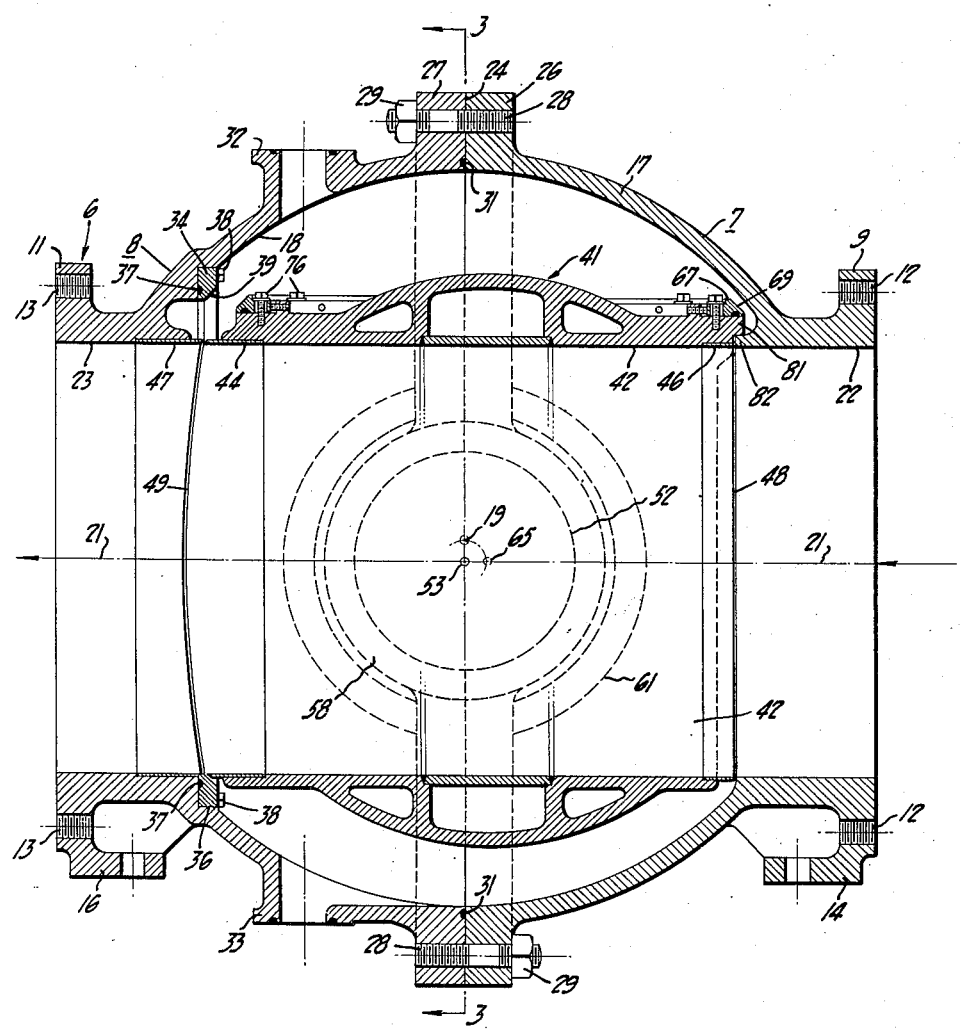
FIG_1_
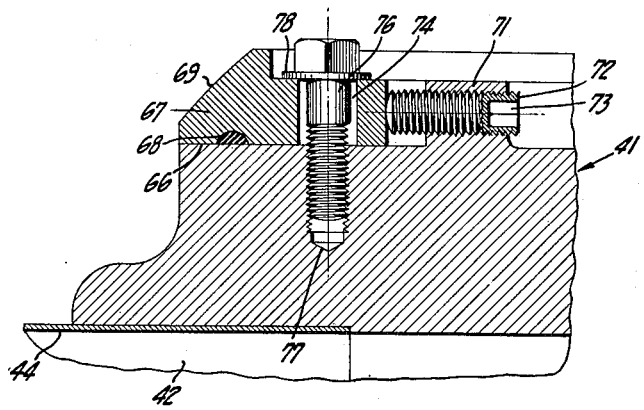
FIG_2_
INVENTOR.
Roy Bacchi
BY

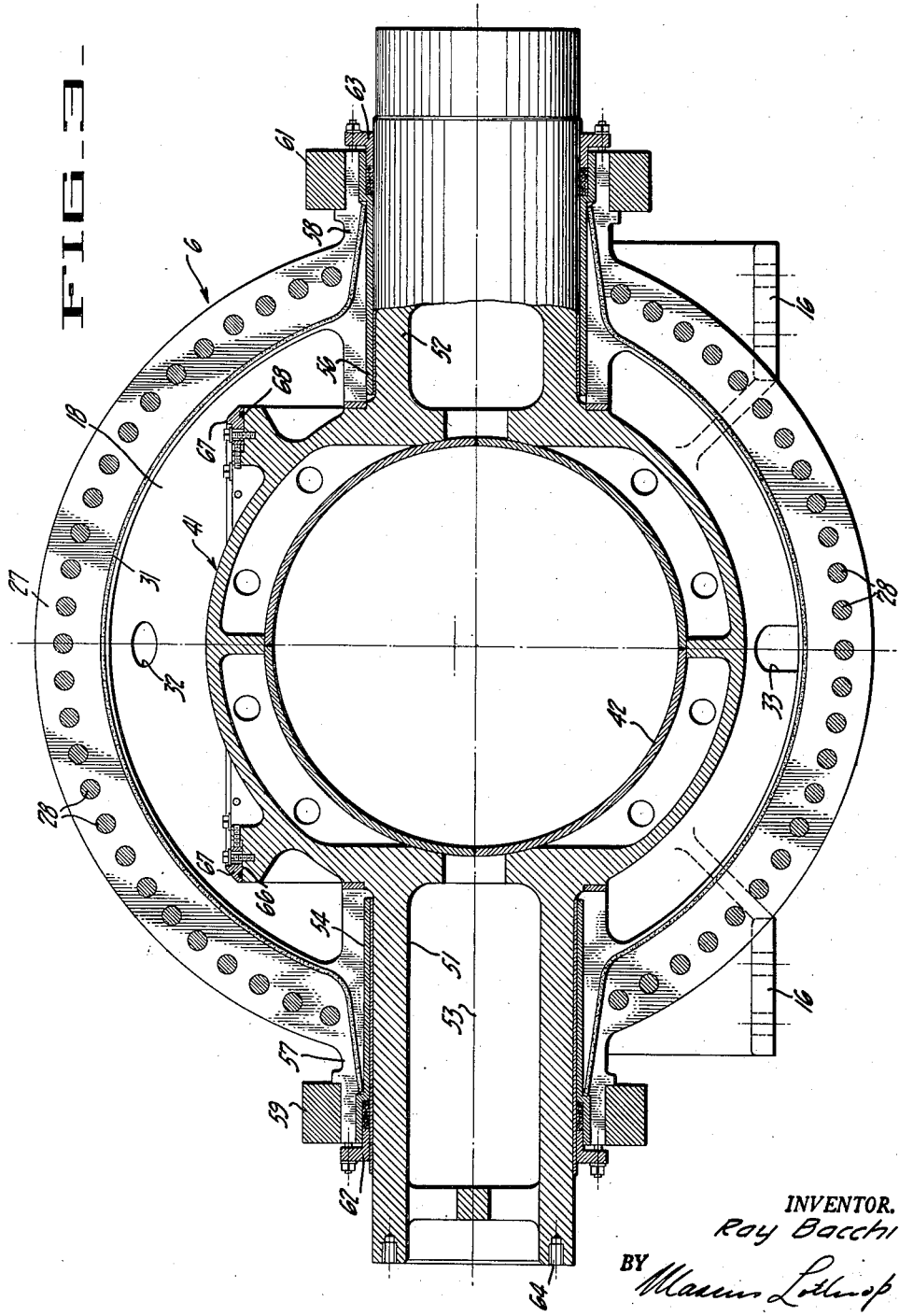

Dec. 22, 1953     R. BACCHI     2,663,538
SPHERICAL VALVE
Filed March 29, 1948     4 Sheets-Sheet 3
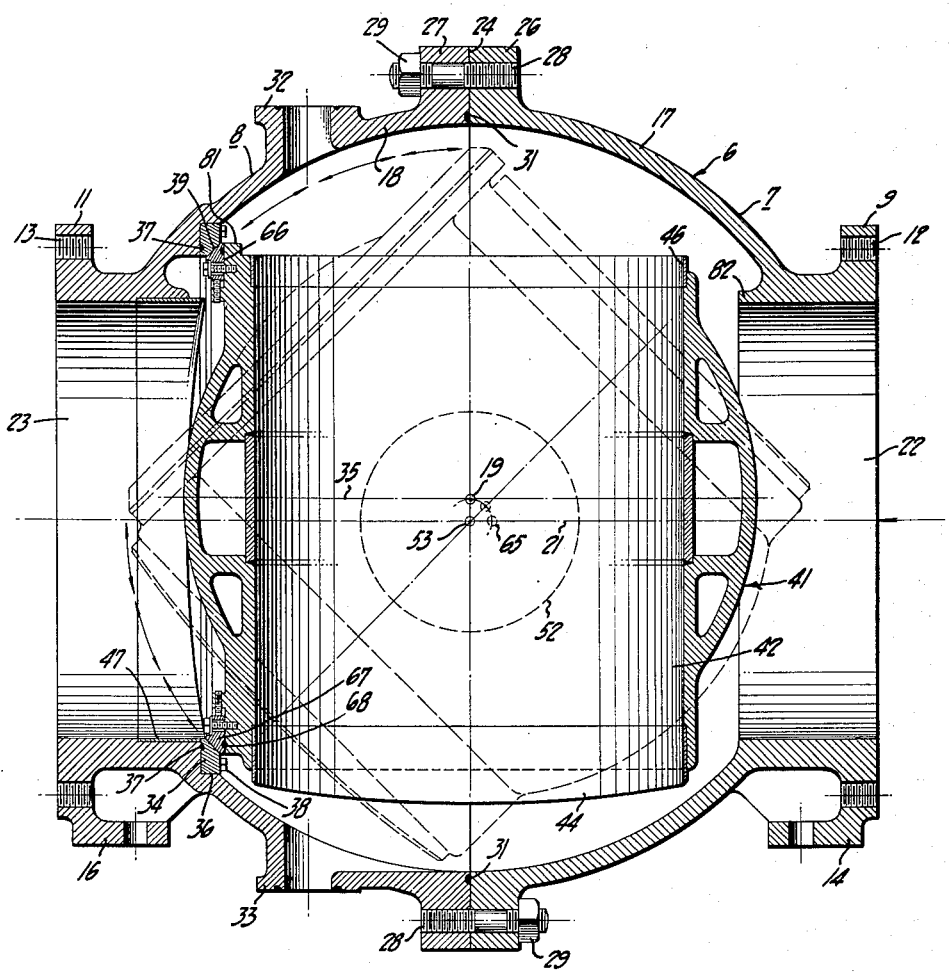
FIG_4_
INVENTOR.
Ray Bacchi
BY Dec. 22, 1953      R. BACCHI      2,663,538
SPHERICAL VALVE
Filed March 29, 1948      4 Sheets-Sheet 4
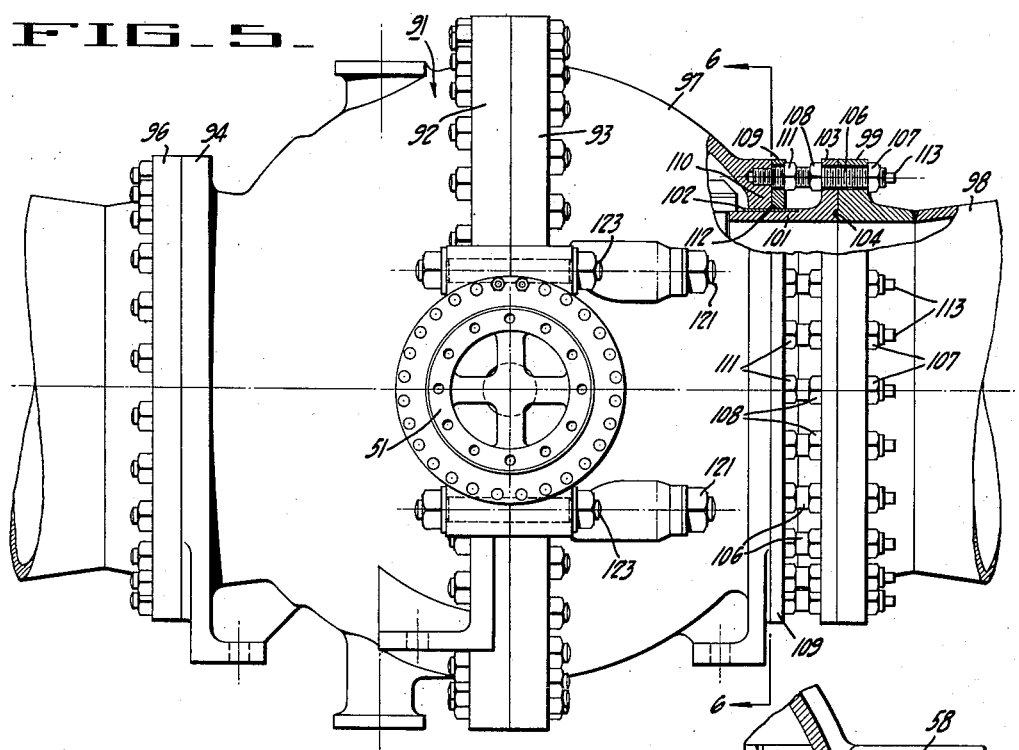
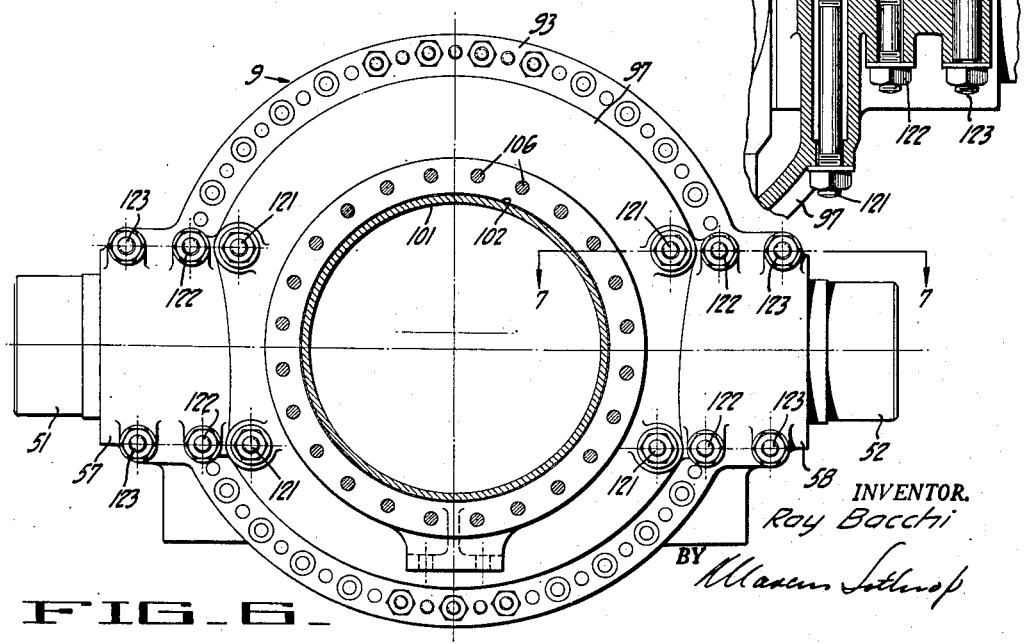
INVENTOR.
Roy Bacchi
BY Patented Dec. 22, 1953

2,663,538

UNITED STATES PATENT OFFICE 2,663,538

SPHERICAL VALVE

Ray Bacchi, San Francisco, Calif., assignor to The Pelton Water Wheel Company, San Francisco, Calif., a corporation of California Application March 29, 1948, Serial No. 17,732

8 Claims. (Cl. 251—113)

My invention relates to means for controlling fluid flow and especially to means for controlling hydraulic or liquid flow in conduits such as pipe lines, especially those of relatively large size and of relatively great length in which considerable accuracy of valving is essential to avoid disruptive forces or effects upon the pipe line or appurtenant mechanism.

My invention also relates to valves of relatively large capacity which, when closed, must be entirely or almost entirely liquid tight and which, when open, must provide a relatively smooth passageway for the flowing liquid in order to reduce hydraulic losses as much as possible.

It is an object of my invention to provide a valve of a nature to be readily fabricated in relatively large sizes and capacities.

Another object of the invention is to provide a valve effective to control a relatively large amount of fluid but requiring only a relatively small amount of power for its actuation.

Another object of the invention is to provide a valve which, when closed, is subject to little or no leakage because the sealing surfaces are in close contact.

A further object of the invention is to provide a valve in which the interior contour, when the valve is open, is relatively continuous and smooth.

A further object of the invention is to provide a valve readily incorporated in a pipe line without requiring excessive space and without involving special constructions or adaptations of a standard pipe line.

A further object of the invention is to provide a valve susceptible to operation by any of the standard operating mechanisms.

A still further object of the invention is to provide a valve which can be installed in or removed from a pipe line with little or no disruption of the surrounding structure.

An additional object of the invention is to provide a valve having essentially simple and straightforward mechanical properties.

Other objects of the invention are attained in the embodiments thereof described in the accompanying description and illustrated in the accompanying drawings, in which Figure 1 is a cross section on a longitudinal vertical plane through a valve constructed in accordance with my invention, the valve being shown in its open position.

Figure 2 is a detail to an enlarged scale showing the mounting arrangement for one of the valve seat rings.

Figure 3 is a cross section, the plane of which is indicated by the line 3—3 of Figure 1.

Figure 4 is a cross section, similar to Figure 1 but showing the valve in its closed position and, in dotted lines, in an intermediate position.

Figure 5 is a side elevation, a portion being shown in cross section, of a modified form of valve of my invention.

Figure 6 is a cross section the plane of which is indicated by the line 6—6 of Figure 5.

Figure 7 is a cross section showing in detail to an enlarged scale a part of the structure sectionalized on the line 7—7 of Figure 6.

In many hydraulic installations particularly those involving relatively large hydraulic pipe lines of considerable length handling large volumes of water, for example in penstocks for hydro-electric generating plants or in aqueducts for water supply there is a general need for a valve to control the flow of water; that is, either to interrupt the flow completely or to permit it to continue freely. It is desirable when the valve is shut that it be virtually drop tight and not susceptible to any substantial amount of leakage whatsoever. It is likewise important when the valve is open that the resistance to hydraulic flow through it be relatively small. In normal operation the valve remains open for long periods and any disturbance to the hydraulic flow which results in a loss of pressure or which unduly disturbs the water is a detrimental factor and it is desired to avoid it.

In order to keep valves with abutting seats adequately tight, the valves are often designed and made unbalanced in some fashion so that the resulting hydraulic pressure when the valve is closed will force the abutting seats together and by metallic contact preclude leakage. A difficulty with such an arrangement is that when the valve is to be opened, the abutting seats must somehow be freed or moved under load. In either instance elaborate mechanism is necessary to free the valve seats or to move them under load.

In accordance with the present invention the sundry requirements mentioned have been met and the objects have been attained by the general type of structure disclosed. While variations are possible and exist for different installations, the general arrangement of the valve is as shown. As represented especially in Figures 1 to 4, the valve incorporates a casing 6 comprised of an upstream half 7 and a downstream half 8, provided with plane-faced, circular flanges 9 and 11, respectively, pierced by threaded bolt holes 12 and 13 in order that the casing 6 can be mechanically and hydraulically incorporated in a line to be controlled by the valve. The flanges 9 and 11 and the casing halves are provided with feet 14 and 16 in order that the weight of the valve can be supported on a suitable foundation, not shown. The casing 6 in general is of a spherical contour in that the envelope walls 17 and 18 of the two halves 7 and 8 are curved about a common center 19. This center is offset from a longitudinal axis 21 which ordinarily is coincident with the axis of the pipe line and is concentric with the circular flanges 9 and 11. The axis 21 is likewise concentric with a circular cylindrical inlet opening 22 and with a similar circular cylindrical outlet opening 23. The casing 6, itself, is divided on a transverse plane to provide a planar joint 24 in a plane parallel with the outer faces of the flanges 9 and 11, perpendicular to the axis 21, and also containing the center 19. The joint 24 is maintained by a pair of peripheral flanges 26 and 27 the former being integral with the casing half 7, whereas the latter is integral with the casing half 8. Alternately anchored studs 28 and nuts 29 removably or detachably secure the casing halves 7 and 8 together in alined relationship. Hydraulic leakage through the joint 24 is resisted by a circular packing 31 incorporated in the joint. Suitable cored bosses 32 and 33 are provided on the casing half 8 in order that the interior of the casing can be unwatered or watered other than from the pipe line.

In accordance with my invention, either the inlet opening 22 or the outlet opening 23 is provided with a valve seat. In the present instance the valve seat is disposed to encompass the outlet opening 23. Accordingly, a casing seat ring 34 is disposed within the casing half 8 and is nested within a re-entrant, circular groove 36 machined in the casing half. Although the ring groove 36 is circular and is in a plane parallel to the plane of the joint 24 and perpendicular to the longitudinal axis 21, it is not concentric with the longitudinal axis but rather is off-set, or displaced, or spaced from such axis on a parallel axis 35 through the point 19. In other words, the center of the ring groove 36 is above (in Figure 1) the longitudinal axis 21 so that the ring 34 is disposed with its interior circular cylindrical periphery substantially tangent at one point to the interior circular cylindrical periphery of the outlet 23, while the remaining portions of the interior peripheries of the ring 34 and of the outlet 23 are not co-extensive.

The ring 34 itself is a metal band arranged to fit snugly within the casing groove 36, is provided with a packing 37 in an appropriate channel and is secured by fasteners 38. The ring is provided with a spherical surface 39. This surface is a part of the surface of an imaginary sphere having its center within the casing 6 in the general region of the intersection of the axis 21 and the transverse plane containing the joint 24, but the center of the spherical surface is not upon the axis 21 but rather is spaced from, displaced from or is separate from such axis and is located at the point 19 in Figure 1.

Located within the casing 6 is a rotor 41. This is substantially a cage or generally hollow body designed to be moved into several positions. There is a circular cylindrical passageway 42 through the rotor designed, in the open position of the valve, substantially to continue the passageway defined by the coaxial inlet opening 22 and outlet opening 23. In order that this passageway be substantially continuous or as uninterrupted as possible, the rotor adjacent each end is provided with inset collars 44 and 46. The collar 46 comes as close as is mechanically feasible to the end surface of the inlet opening 22 whereas the collar 44 comes as close as mechanically feasible to a similar collar 47 inserted into and forming a continuation of the outlet opening 23. The collars 44 and 47 terminate on arcuate cylindrical surfaces the generatrices of which are parallel to the plane of the joint 24. In this fashion the openings 48 and 49 between the casing 6 and the rotor 41 in the open position of the valve are exceedingly small and produce no substantial interference with the free flow of the hydraulic fluid.

In order that the rotor 41 can be readily moved as desired, it is provided with a pair of shafts 51 and 52 preferably formed integrally with the rotor casting and extending from opposite sides thereof coaxial with an axis 53. This transverse axis intersects the longitudinal axis 21 of the casing 6 and is perpendicular thereto, being also contained in the plane containing the joint 24. The shafts 51 and 52 are provided with antifriction bearings 54 and 56 received in suitable bosses 57 and 58 formed in lateral portions of the two casing halves 7 and 8. The bosses 57 and 58 are split, and after assembly are encompassed by binding rings 59 and 61. Packing glands 62 and 63 preclude leakage along the shafts. The shafts 51 and 52 being integrally formed with the rotor casting are, like the entire casting, cored so that the interiors are hollow and the weight of the rotor is reduced.

At one end, the shaft 51 is formed with an attaching flange 64 for the reception of a lever or crank or other suitable operating device effective to rotate the shaft and the rotor about the transverse axis 53; that is, about a point on the longitudinal axis 21. The rotation of the rotor is between two extreme positions, the first position being an open position as shown in Figure 1 and the second position being a closed position as shown in Figure 4. This rotation is approximately 90 degrees in extent and is effective to move the valve rotor from its completely open position into its completely closed position.

In order that, when closed, the valve will be substantially tight, and in order that the valve will remain tight after closure, I provide a rotor seat 66 on the rotor 41. This seat is a planar circular surface the plane of which in the closed position of the valve is substantially parallel to the joint 24, but the center of which is not then on or coincident with the axis 21, but rather is displaced or spaced or offset from such axis and is upon the center 19 and in the open position of the valve shifts to a point 65 on the axis 21.

Designed to fit upon the seat 66 is a rotor seat ring 67. This is an annulus of metal provided with a sealing ring 68. The ring is formed with an external spherical surface 69 which in the closed position of the valve is centered about the point 19, that is, it has the same center as the surface 39. The seat ring 67 is designed tightly to abut the seat ring 34. The two spherical surfaces come into intimate metal to metal contact when the valve is closed, there being a translation of such surfaces toward each other due to the spacing of the center 19 from the axis 21 and from the axis 53.

Because of the inevitable discrepancies in manufacture or installation, particularly in large size equipment, the ring 67 is not located upon the surface 66 or the rotor in a fixed manner, but is provided with an adjustment. As particularly illustrated in Figure 2, the rotor is formed with a projecting annulus 71. The annulus is radially drilled and tapped around its periphery at intervals to accommodate threaded studs 72, formed at one end 73 to receive a suitable tool for rotation. The ring 67 is provided adjacent the point of contact of each of the studs 72, with a radially elongated or generally enlarged opening 74, through which passes a bolt 76 engaging a suitably threaded bore 77 within the rotor itself. A washer 78 spans the space between the shank of the bolt 76 and the surrounding material of the ring 67.

In use, the bolts 76 are loosened and the screws 72 are individually located in appropriate radial positions so that they define a true circle having the appropriate center so that the exterior spherical surface 69 of the ring 67 will come appropriately into exact abutment with the mating or matching cooperating spherical surface 39 of the seat ring 34. When the screws 72 have been so adjusted, and the ring 67 is then accurately positioned, the bolts 76 are tightened in order to retain the ring in set position.

With this arrangement, when the journal shafts 51 and 52 are rotated to move to rotor from its open position as shown in Figure 1 through an intermediate position shown in dotted lines in Figure 4 and into the final position shown in full lines in Figure 4, the spherically surfaced rotor seat ring is moved about the transverse axis 53 as a center. The rotor carries the eccentric seat ring 67 into close approach to and final abutment with the eccentric casing seat ring 34. If these two rings were concentric with the longitudinal axis 21 of the valve, they would never come into abutment but would rather rotate or slide over each other with more or less clearance depending upon the accuracy of manufacture of the structure. The valve then would be completely balanced and the pressure of the water would be entirely taken by the bearings 54 and 56. Whatever mechanical clearance existed between the concentric seats of the rotor and casing would serve as an escape passageway for water. The valve, even though nominally closed, would leak.

In accordance with my invention, however, the spherically surfaced seats are eccentric so that when the valve rotor approaches and finally comes into closed position there is not only a part or component of rotary motion, but there is in addition a translatory or translational component of the motion which brings the surfaces into actual physical abutment. Since the valve seats are not concentric but rather are slightly eccentric the valve is correspondingly unbalanced and the pressure of the water tends to rotate the rotor into closed position. The load due to the hydraulic pressure is borne not only by the bearings 54 and 56 but also is imposed upon the sealing rings 67 and 34, forcing the spherical surfaces 69 and 39 thereof into close abutment. This reduces to a negligible amount any clearance therebetween and substantially precludes leakage. At the same time the amount of eccentricity of the rotor seat is such that the valve is nearly enough balanced so that the rotor can be moved out of its closed position without undue force. Since the movement is not strictly a rotation or spherical swing, but rather has a translational or longitudinal component, the seats come apart readily without scraping or dragging and the valve is easily opened. It is swung into the open position as shown in Figure 1 until such time as a shoulder 81 on the rotor abuts a lip 82 on the upstream half 7 of the casing to serve as a stop.

With the valve as illustrated, there is provided a smooth through passage for water when the valve is opened and a tight closure when the valve is closed, the opening and closing force required is readily supplied through the shafts. The valve itself is of a compact, generally symmetrical nature readily incorporable in a pipe line without unusual space requirements. In addition, the nature of the valve makes it possible to supply parts for a very large valve without complicated mechanism and without difficulties in manufacture. In some installations, particularly where the valves are very large, I prefer to modify the casing construction somewhat as shown in the remaining figures of the drawing, even though the interior portion of the valve is not materially altered.

As shown particularly in Figures 5, 6 and 7, the valve casing 91 is substantially as previously described insofar as its joint flanges 92 and 93 are concerned and insofar as its flange 94 connecting to the pipe line flange 96 is concerned. There is a variation, however, in the connection of the upstream half 97 of the casing with the upstream pipe line 98. While the pipe line is provided with the customary terminal flange 99, the casing half 97 does not itself have a bolt flange but rather is cylindrically bored in a concentric fashion to receive slidably a sleeve 101 provided with a peripheral antifriction material 102 and forming part of an intermediate flange 103.

The intermediate flange is designed to abut the flange 99 with a suitable packing 104 therebetween and to be held against such flange by a through bolt 106. This is of special construction and carries nuts 107 and 108 abutting the respective flanges which when tightened form a water tight connection pipe. The bolts 106, however, are extended to pass through relatively large holes on a locking plate 109 abutting the flange 110 and then are reduced and threaded into the upstream casing portion 97. Nuts 111 on the bolts 106 hold the ring 109 against the casing half. A packing ring 112 is thus retained against the antifriction material 102.

With this arrangement, the bolts 106 can be removed from the upstream casing half 97 and a noncircular end 113 is provided on the bolts for that purpose. This is accomplished after the nut 107 has been removed and the nuts 108 and 111 have been loosened. When the fastenings which hold the flanges 94 and 96 together have been removed and the ring 101 has been displaced into the interior of the valve casing (with the rotor in closed position) the overall dimensions of the valve is reduced a sufficient amount so that it can be removed transversely from between the flanges 99 and 96. Afterward the entire assembly can be returned or a different assembly can be substituted and aligned with the pipeline following which the bolts and nuts are all reassembled. The nuts 108 act on the bolts 106 as screw jacks in order to force the flanges into correct position.

Also in this form of the valve casing, and partly because the casing design permits valve removability without disturbing the remainder of the pipe line, the valve casing itself is further modified. In the vicinity of the shafts 51 and 52, the bosses 57 and 58 are provided with relatively long studs 121 and 122 (Figure 7) extending from the downstream casing half through the upstream casing half to receive fastening nuts. In locations more remote from the shaft where more wrench room is available through bolts 123 are provided.

The provision of fastenings in this manner affords an improved manner for holding the casing halves together and for readily removing the fastenings when the valve is to be demounted.

I claim:

1. A spherical valve comprising a casing having an inlet and an outlet alined on a longitudinal axis, a seat ring having a first sealing surface encompassing said outlet and disposed on said casing with its center displaced from said axis, a rotor journalled in said casing to turn about a transverse axis intersecting said longitudinal axis, and a rotor ring having a second sealing surface on said rotor adapted in one position of said rotor to abut said first sealing surface on said seat ring.

2. A spherical valve comprising a casing having an inlet and an outlet alined on a longitudinal axis, a seat ring disposed in said casing perpendicular to said longitudinal axis and having a spherical first sealing surface encompassing said outlet with the center of said surface displaced from said axis, a rotor journalled in said casing to turn about a transverse axis intersecting said longitudinal axis, and a rotor ring on said rotor and having a spherical second sealing surface adapted in one position of said rotor to abut said first sealing surface on said seat ring.

3. A spherical valve comprising a casing having an outlet, a casing seat having a spherical first sealing surface encompassing said outlet, the geometrical center of said first sealing surface being at a predetermined point within said casing, a rotor journalled in said casing to turn about a fixed axis spaced from said point, and a rotor seat having a spherical second sealing surface adapted in one position of said rotor to abut said first sealing surface on said casing seat.

4. A spherical valve comprising a casing having a contour spherical about a predetermined point and having inlet and outlet openings alined on an axis displaced from said point, a first valve seat in said casing having a surface spherical about said point, a rotor in said casing, a second valve seat on said rotor having a surface spherical about said point, and means for rotating said rotor solely about a point on said axis.

5. A spherical valve comprising a casing having inlet and outlet openings alined on a first longitudinal axis, a rotor journalled in said casing to turn about a second axis perpendicular to said longitudinal axis, said rotor having a passage therethrough in a first position of said rotor forming a substantial continuation of said inlet and said outlet openings, a rotor ring on said rotor, said rotor ring having a first sealing surface eccentric to said second axis, and a casing ring encompassing said outlet, said casing ring having a second sealing surface eccentric to said first axis and in a second position of said rotor abutting said first sealing surface on said rotor ring.

6. A spherical valve comprising a casing having a cylindrical inlet and a cylindrical outlet alined on a longitudinal axis, a circular seat ring having a first sealing surface encompassing said outlet and disposed in said casing with the axis of said seat ring parallel to but displaced from said longitudinal axis and with the center of said first sealing surface on said seat ring axis, a rotor journalled in said casing for rotation about a fixed axis perpendicular to and intersecting said longitudinal axis, said rotor having a passageway therethrough in one rotated position of said rotor alining with said inlet and said outlet, and a circular rotor ring on said rotor having a second sealing surface in another rotated position of said rotor coaxially engaging said first sealing surface on said seat ring.

7. A spherical valve comprising a casing having an outlet symmetrical about a longitudinal axis, a casing seat having a surface encompassing said outlet, a rotor journalled directly in said casing to turn about a fixed transverse axis perpendicularly intersecting said longitudinal axis, and a rotor seat having a surface adapted in one position of said rotor to abut said casing seat, said surfaces being spherical about a common center displaced from said transverse axis in a direction at right angels to said longitudinal axis.

8. A spherical valve comprising a casing having an inlet opening and an outlet opening symmetrical about a longitudinal axis, a first valve seat in said casing surrounding one of said openings, said first seat having a spherical surface, a rotor within and supported directly on said casing, means for mounting said rotor for rotation about a fixed transverse axis perpendicularly intersecting said longitudinal axis, a second valve seat on said rotor, said second seat having a matching spherical surface, said spherical surfaces having a common center displaced from said transverse axis in a direction at right angles to said longitudinal axis, and means for rotating said rotor about said transverse axis.

RAY BACCHI.

References Cited in the file of this patent

UNITED STATES PATENTS

| Number | Name | Date |
| --- | --- | --- |
| 524,922 | Walsh | Aug. 21, 1894 |
| 1,656,183 | Enz | Jan. 17, 1928 |
| 2,577,725 | Drake | Dec. 11, 1951 |

FOREIGN PATENTS

| Number | Country | Date |
| --- | --- | --- |
| 45,934 | France | of 1936 |
| 213,331 | Germany | of 1909 |
| 477,295 | Germany | of 1929 |
| 599,176 | France | of 1926 |
| 624,406 | Germany | of 1935 |